(12) United States Patent
Chen et al.

(10) Patent No.: US 11,434,839 B2
(45) Date of Patent: Sep. 6, 2022

(54) USE OF MACHINE LEARNING FOR DETECTING CYLINDER INTAKE AND/OR EXHAUST VALVE FAULTS DURING OPERATION OF AN INTERNAL COMBUSTION ENGINE

(71) Applicant: Tula Technology, Inc., San Jose, CA (US)

(72) Inventors: Shikui Kevin Chen, San Jose, CA (US); Aditya Mandal, San Jose, CA (US); Louis J. Serrano, Los Gatos, CA (US); Xiaoping Cai, Fremont, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/137,955

(22) Filed: Dec. 30, 2020

(65) Prior Publication Data

US 2022/0205398 A1    Jun. 30, 2022

(51) Int. Cl.
| | |
|---|---|
| *F02D 41/00* | (2006.01) |
| *F02D 17/02* | (2006.01) |
| *F02D 41/14* | (2006.01) |
| *F02D 41/22* | (2006.01) |
| *G06N 20/00* | (2019.01) |
| *G06N 5/04* | (2006.01) |
| *F01N 13/10* | (2010.01) |

(52) U.S. Cl.
CPC ......... *F02D 41/0087* (2013.01); *F02D 17/02* (2013.01); *F02D 41/1405* (2013.01); *F02D 41/22* (2013.01); *F01N 13/10* (2013.01); *F02D 2200/0406* (2013.01); *F02D 2200/101* (2013.01); *G06N 5/04* (2013.01); *G06N 20/00* (2019.01)

(58) Field of Classification Search
CPC .. F02D 41/0087; F02D 17/02; F02D 41/1405; F02D 41/22; F02D 2200/0406; F02D 2200/101; F01N 13/10; G06N 5/04; G06N 20/00
USPC ............................................ 701/101; 73/114
See application file for complete search history.

(56) References Cited

U.S. PATENT DOCUMENTS

| | | | |
|---|---|---|---|
| 4,434,767 | A | 3/1984 | Kohama et al. |
| 4,489,695 | A | 12/1984 | Kohama et al. |

(Continued)

FOREIGN PATENT DOCUMENTS

| | | |
|---|---|---|
| JP | 2011-99338 | 5/2011 |
| KR | 10-2017-0125590 | 11/2017 |

(Continued)

OTHER PUBLICATIONS

"Fourier Neural Networks and Generalized Single Hidden Layer Networks in Aircraft Engine Fault Diagnostics"; Author H.S. Tan; retrieved from the internet Feb. 11, 2006; URL: https://asmedigitalcollection.asme.org/gasturbinespower/article/128/4/773/465095/Fourier-Neural-Networks-and-Generalized-Single (Year: 2006).*

(Continued)

*Primary Examiner* — Sizo B Vilakazi
*Assistant Examiner* — Brian R Kirby
(74) *Attorney, Agent, or Firm* — Beyer Law Group LLP

(57) ABSTRACT

A system and method for the use of machine learning for detecting faults for cylinder intake and/or exhaust valves that do not properly open or close as commanded and for generating a flag for such faults.

20 Claims, 8 Drawing Sheets

(56) References Cited

U.S. PATENT DOCUMENTS

| | | | |
|---|---|---|---|
| 4,509,488 | A | 4/1985 | Forster et al. |
| 5,041,976 | A * | 8/1991 | Marko ............... G01R 31/007 |
| | | | 701/32.9 |
| 5,200,898 | A * | 4/1993 | Yuhara ............... F02D 41/045 |
| | | | 123/480 |
| 5,361,213 | A * | 11/1994 | Fujieda ............ F02D 41/1405 |
| | | | 123/436 |
| 5,377,631 | A | 1/1995 | Schechter |
| 5,433,107 | A | 7/1995 | Angermaier et al. |
| 5,721,375 | A * | 2/1998 | Bidner ............... F02D 41/0087 |
| | | | 701/101 |
| 5,774,823 | A | 6/1998 | James et al. |
| 5,790,757 | A * | 8/1998 | Meijer ............... G06F 17/13 |
| | | | 706/45 |
| 5,826,563 | A | 10/1998 | Patel et al. |
| 6,006,155 | A | 12/1999 | Wu et al. |
| 6,158,411 | A | 12/2000 | Morikawa |
| 6,382,175 | B1 * | 5/2002 | van der Staay ....... F02D 41/222 |
| | | | 123/90.11 |
| 6,457,353 | B1 * | 10/2002 | Kanke ............... F01L 9/20 |
| | | | 73/114.42 |
| 6,564,623 | B2 | 5/2003 | Zanetti |
| 6,619,258 | B2 | 9/2003 | McKay et al. |
| 6,801,848 | B1 | 10/2004 | Matthews |
| 7,063,062 | B2 | 6/2006 | Lewis et al. |
| 7,066,136 | B2 | 6/2006 | Ogiso |
| 7,086,386 | B2 | 8/2006 | Doering |
| 7,171,929 | B2 * | 2/2007 | Dosdall ............... F02D 41/221 |
| | | | 123/90.22 |
| 7,234,442 | B2 | 6/2007 | Hanson et al. |
| 7,503,312 | B2 | 3/2009 | Sumilla et al. |
| 7,577,511 | B1 | 8/2009 | Tripathi et al. |
| 7,921,709 | B2 * | 4/2011 | Doering ............... F02D 41/221 |
| | | | 73/114.37 |
| 7,930,087 | B2 | 4/2011 | Gibson et al. |
| 8,099,224 | B2 | 1/2012 | Tripathi et al. |
| 8,286,471 | B2 * | 10/2012 | Doering ............. F02D 41/0087 |
| | | | 73/114.79 |
| 8,601,862 | B1 | 12/2013 | Bowman et al. |
| 8,931,255 | B2 | 1/2015 | Wilson et al. |
| 9,086,020 | B2 | 7/2015 | Tripathi et al. |
| 9,212,610 | B2 | 12/2015 | Chen et al. |
| 9,399,963 | B2 | 7/2016 | Loucks et al. |
| 9,399,964 | B2 | 7/2016 | Younkins et al. |
| 9,523,319 | B2 | 12/2016 | Wilson et al. |
| 9,581,098 | B2 | 2/2017 | Chen et al. |
| 9,587,567 | B2 | 3/2017 | Zhang et al. |
| 9,784,644 | B2 | 10/2017 | Chen et al. |
| 10,072,592 | B2 | 9/2018 | Younkins et al. |
| 10,088,388 | B2 | 10/2018 | Chen et al. |
| 10,816,438 | B2 | 10/2020 | Chen et al. |
| 2003/0213445 | A1 * | 11/2003 | Bloms ............... F01L 13/06 |
| | | | 123/90.15 |
| 2007/0101959 | A1 | 5/2007 | Soejima |
| 2007/0113803 | A1 | 5/2007 | Froloff et al. |
| 2008/0236267 | A1 | 10/2008 | Hartmann et al. |
| 2008/0243364 | A1 | 10/2008 | Sun et al. |
| 2009/0099755 | A1 | 4/2009 | Harbert |
| 2009/0158830 | A1 | 6/2009 | Malaczynski et al. |
| 2010/0031738 | A1 * | 2/2010 | Feldkamp ........... G01M 15/042 |
| | | | 73/114.79 |
| 2010/0050993 | A1 | 3/2010 | Zhao et al. |
| 2010/0106458 | A1 * | 4/2010 | Leu ............... F04B 49/065 |
| | | | 702/181 |
| 2010/0175463 | A1 * | 7/2010 | Doering ............... F02D 41/221 |
| | | | 73/114.37 |
| 2017/0002761 | A1 | 1/2017 | Dudar |
| 2017/0218866 | A1 | 8/2017 | Shost et al. |
| 2017/0370804 | A1 * | 12/2017 | Chen ............... G01M 15/11 |
| 2019/0145859 | A1 | 5/2019 | Chen et al. |
| 2019/0234323 | A1 | 8/2019 | Weber et al. |
| 2020/0263617 | A1 * | 8/2020 | Hashimoto ............ F02D 41/22 |

FOREIGN PATENT DOCUMENTS

| | | |
|---|---|---|
| WO | WO 2010/006311 | 1/2010 |
| WO | WO 2011/085383 | 7/2011 |

OTHER PUBLICATIONS

Chen et al., U.S. Appl. No. 17/026,706, filed Sep. 21, 2020.
Cybenko, "Approximation by Superpositions of a Sigmoidal Function", Mathematics of Control, Signals, and Systems, (1989) 2: 303-314.
Hinton et al., "Deep Neural Networks for Acoustic Modeling in Speech Recognition", Signal Processing Magazine, IEEE, 29(6): 8297, 2012a, Apr. 27, 2012.
Krizhevsky et al., "ImageNet Classification with Deep Convolutional Neural Networks", https://papers.nips.cc/paper/4824-imagenet-classification-with-deep-convolutional-neural-networks.pdf, Jan. 2012.
Weston et al., "Towards AI-Complete Question Answering: A Set of Prerequisite Toy Tasks", ICLR, Dec. 31, 2015.
Glorot et al., "Understanding the Difficulty of Training Deep Feedforward Neural Networks", In Proceedings of AISTATS 2010, vol. 9, pp. 249256, May 2010.
Wilcutts et al., "Design and Benefits of Dynamic Skip Fire Strategies for Cylinder Deactivated Engines", SAE Int. J. Engines, 6(1): 2013, doi: 10.4271/2013-01-0359, Apr. 8, 2013.
Serrano et al., "Methods of Evaluating and Mitigating NVH When Operating an Engine in Dynamic Skip Fire", SAE Int. J. Engines 7(3): 2014, doi: 10.4271/2014-01-1675, Apr. 1, 2014.
Liu et al., "Standards Compliant HIL Bench Development for Dynamic Skip Fire Feature Validation", SAE Technical Paper 2015-01-0171, 2015, Apr. 14, 2015.
Chen et al., "Misfire Detection in a Dynamic Skip Fire Engine", SAE Int. J. Engines 8(2): 389-398, 2015, Apr. 14, 2015.
Chien et al., "Modeling and Simulation of Airflow Dynamics in a Dynamic Skip Fire Engine", SAE Technical Paper 2015-01-1717, Apr. 14, 2015.
Eisazadeh-Far et al., "Fuel Economy Gains Through Dynamic-Skip-Fire in Spark Ignition Engines", SAE Technical Paper 2016-01-0672, Jul. 20, 2015.
Wilcutts et al., "eDSF: Dynamic Skip Fire Extension to Hybrid Powertrains", 7th Aachen Colloquium China Automobile and Engine Technology 2017.
Ortiz-Soto et al., "DSF: Dynamic Skip Fire with Homogeneous Lean Burn for Improved Fuel Consumption, Emissions and Drivability", SAE Technical Paper 2018-01-1891, Apr. 3, 2018.
Chen et al., "Machine Learning for Misfire Detection in a Dynamic Skip Fire Engine", SAE Technical Paper 2018-01-1158, Apr. 3, 2018.
Chen et al., "Dynamic Skip Fire Applied to a Diesel Engine for Improved Fuel Consumption and Emissions", Presented at the 4. Int. Conf. Diesel Powertrains 3.0, Jul. 3-4, 2018.
Younkins et al., "Advances in Dynamic Skip Fire: eDSF and mDSF", 27th Aachen Colloquium Automobile and Engine Technology, 2018.
Younkins et al., "Dynamic Skip Fire: New Technologies for Innovative Propulsion Systems", General Motors Global Propulsion Systems, 39th International Vienna Motor Symposium, Apr. 2018.
Younkins et al., "Dynamic Skip Fire: The Ultimate Cylinder Deactivation Strategy", 29th Edition of the SIA Powertrain Congress, Versailles, Jun. 7-8, 2017.
Asik et al., "Transient A/F Estimation and Control Using a Neural Network", SAE Technical Paper 970619, 1997 (SP-1236), 1997.
Kalogirou et al., "Development of an Artificial Neural Network Based Fault Diagnostic System of an Electric Car", Design and Technologies for Automotive Safety-Critical Systems, SAE Technical Paper 2000-011055, 2000 (SP-1507), Mar. 6-9, 2000.
Wu et al., "Misfire Detection Using a Dynamic Neural Network with Output Feedback", Electronic Engine Controls 1998: Diagnostics and Controls, SAE Technical Paper 980515, 1998 (SP-1357), Feb. 23-26, 1998.

(56) References Cited

OTHER PUBLICATIONS

Nareid et al., "Detection of Engine Misfire Events Using an Artificial Neural Network", Electronic Engine Controls, SAE Technical Paper 2004-01-1363, 2004 (SP-1822), Mar. 8-11, 2004.

Kirkham et al., "Misfire Detection Including Confidence Indicators Using a Hardware Neural Network", Electronic Engine Controls, SAE Technical Paper, 2006-11-1349, 2006 (SP-2003), Apr. 3-6, 2006.

Merkisz et al., "Overview of Engine Misfire Detection Methods Used in On Board Diagnostics", Journal of Kones Combustion Engines, vol. 8, No. 1-2, 2001.

Chatterjee et al., "Comparison of Misfire Detection Technologies on Spark-ignition Engines for Meeting On-Board Diagnostic Regulation", 2013 SAE International, doi: 10 4271/2013-01-2884, Nov. 27, 2013.

Bue et al., "Misfire Detection System Based on the Measure of Crankshaft Angular Velocity", Advanced Microsystems for Automotive Applications, 2007, pp. 149-161.

Baghi Abadi et al., "Single and Multiple Misfire Detection in Internal Combustion Engines Using Vold-Kalman Filter Order-Tracking", SAE Technical Paper 2011-01-1536, 2011, doi: 10,4271/2011-01-1536, May 17, 2011.

Shiao et al., "Cylinder Pressure and Combustion Heat Release Estimation for SI Engine Diagnostics Using Nonlinear Sliding Observers", IEEE Transactions on Control Systems Technology, vol. 3. No. 1, Mar. 1995.

Ball et al., "Torque Estimation and Misfire Detection Using Block Angular Acceleration", SAE Technical Paper 2000-01-0560, Mar. 6-9, 2000.

Abu-Mostafa et al., "Learning From Data", AMLbook.com, ISBN 10:1 60049 006 9, ISBN 13:978 1 60049 006 4, Chapter 7, 2012.

Pedregosa et al., "Scikit-Learn: Machine Learning in Python", Journal of Machine Learning Research, 12 (2011) 2825-2830, Oct. 2011.

International Search Report and Written Opinion dated Apr. 7, 2022 from International Application No. PCT/US2021/061219.

* cited by examiner

| TRUE NEGATIVE | FALSE POSITIVE |
|---|---|
| TRUE POSITIVE | FALSE NEGATIVE |

FIG. 3B

USE OF MACHINE LEARNING FOR DETECTING CYLINDER INTAKE AND/OR EXHAUST VALVE FAULTS DURING OPERATION OF AN INTERNAL COMBUSTION ENGINE

FIELD OF THE INVENTION

The present invention relates to internal combustion engines, and more particularly, to the use of machine learning for detecting faults for cylinder intake and/or exhaust valves that do not properly open or close as commanded and for generating a flag for such faults.

BACKGROUND

A conventional internal combustion engine (hereafter sometimes referred to simply as "engine" for brevity) includes multiple cylinders, one or more intake and one or more exhaust valves per cylinder, and a valve train for controlling the operation of the intake valve(s) and exhaust valve(s). During operation, the cylinders of the engine are typically fired in a sequence order every engine cycle. As each cylinder is to be fired, the valve train controls the timing of the activation of the intake valve(s) and exhaust valve(s). That is, during the induction stroke of a working cycle of a cylinder, the intake valve(s) is/are opened, allowing an air charge to be inducted into the working chamber of the cylinder. Fuel is typically injected into the working chamber as well. Thereafter, the intake valve(s) are closed for the compression stroke and the subsequent power stroke. In the exhaust stroke, the exhaust valve(s) are then opened, allowing combusted gases to be exhausted out of the working chamber. The above-described process is continually repeated for the working cycles of each cylinder in sequence order, engine cycle after engine cycle.

More recently, variable displacement engines have been introduced. With variable displacement, the engine can be operated at full displacement when needed, but at a reduced displacement when less torque is needed. One known approach for implementing variable displacement is to activate only one group of one or more cylinders, while a second group of one or more cylinders is deactivated. For instance with an eight cylinder engine, a group of 2, 4 or 6 cylinders can be deactivated, meaning the engine is operating at fractions of ¾, ½ of ¼ of full displacement of the engine respectively. Skip fire engine control is another known approach for varying the effective displacement of internal combustion engines. During skip fire operation, some firing opportunities of cylinders are fired, while other firing opportunities of cylinders are skipped. By operating the engine at different firing densities or fractions (e.g., ⅛, 2/7, ⅓, ¼, ½, etc.), the engine is allowed to operate at different effective reduced displacements, all of which are less than the full displacement (i.e., a firing fraction of 1) of the engine. In general, skip fire enables finer engine control than possible with conventional viable displacement. For instance the Applicant of the present application currently commercially offers a skip fire solution that includes up to 29 different firing fractions or effective reduced displacement, which is significantly more than possible with the conventional approach.

With either type of variable displacement approach, deactivated cylinders are typically skipped and not fired. With skipped working cycles, the intake valve(s) and exhaust valve(s) are typically commanded to not open as normal when fired. In other words during a skipped working cycle, the intake valve(s) of the cylinder are deactivated so there is no induction and the exhaust valve(s) remain deactivated so there is no exhausting of gases from the working chamber. One issue with variable displacement engines is that if a cylinder is skipped over successive working cycles, the in-cylinder pressure may become too low, which causes oil to be "sucked" into the working chamber. To prevent this issue, a re-breathing strategy may be employed, which ordinarily involves (a) opening the exhaust valve(s) at the end of one working cycle and (b) opening the intake valve(s) during the next skipped working cycle, allowing an air charge to be inducted into the working chamber. As a result, the pressure within the chamber is increased, preventing oil from seeping into the working chamber. However, since no fuel is typically injected, there is no combustion.

With internal combustion engines, including variable displacement engines that may or may not rely on re-breathing, both intake and exhaust valves are commanded to be opened and closed. Sometimes, however, valves are not activated or deactivated as commanded. To the best knowledge of the Applicant, machine learning has never been used for detecting faults for intake and/or exhaust valves that do not properly open or close as commanded and for generating a valve fault flag for such faults.

SUMMARY OF THE INVENTION

The present invention relates to a system and method for using machine learning to detect faults for intake and/or exhaust valves that do not properly open or close as commanded and for generating a valve fault flag for such faults.

The system includes an internal combustion engine having a plurality of cylinders and an engine system controller. The engine system controller is configured to generate a command to either open or close a valve associated with a select cylinder, selected among the plurality of cylinders, for a given working cycle, feed one or more signals indicative of one or more operational parameters of the vehicle to a model, the model specifying weighted variables for the one or more operational parameters of the vehicle respectively, the weighted variables of the model derived from training using machine learning, compare the command to an output of the model, the output of the model being a probability of a behavior of the valve associated with the select cylinder during the given working cycle, and generate a valve fault flag if the comparison yields that the probability of the behavior of the valve does not match the command.

The present invention also involves a method for training a model for detecting valve faults, the method comprising (a) defining the model using machine learning, the model specifying weighted values for a plurality of operational parameters of a test vehicle, (b) providing a valve command to a valve of a cylinder of a test internal combustion engine of the test vehicle, the valve command directing the valve to selectively either to open or remain closed during a valve event, (c) providing to the model a plurality of signals indicative of the plurality of operational parameters of the test vehicle while the test internal combustion engine is operating and the valve is implementing the valve command; (d) configuring the model to generate a probability of a behavior of the valve during the valve event and in response to the valve command, the probability indicative that the behavior of the valve during the valve event is either the valve opened or remained closed, (e) determining if the probability generated by the model is accurate or not by comparing the probability to the valve command, and (f) iterating (b) through (e) for a plurality of valves of a plurality of cylinders of the test internal combustion engine over multiple engine cycles; and (f) in response to the iterations, "training" the model by updating the one or more of the weighted values for the plurality of operational parameters specified in the model.

BRIEF DESCRIPTION OF THE DRAWINGS

The invention and the advantages thereof may best be understood by reference to the following description taken in conjunction with the accompanying drawings in which:

FIG. 3B is a diagram illustrating four possible outcomes using the model during training in accordance with a non-exclusive embodiment of the invention.

In the drawings, like reference numerals are sometimes used to designate like structural elements. It should also be appreciated that the depictions in the figures are diagrammatic and not to scale.

DETAILED DESCRIPTION

Figure 1A:
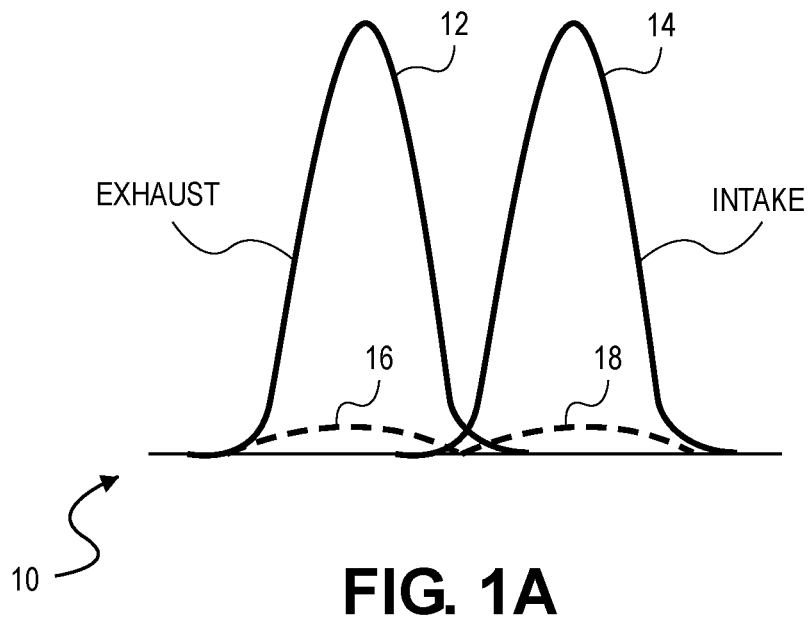
FIG. 1A illustrates a successful and a faulty valve lift for both an intake valve and an exhaust valve of a cylinder when commanded to reactivate or open.

The Applicant has previously filed U.S. application Ser. No. 16/180,703 (TULA P068) (now U.S. Pat. No. 10,816,438), which covers the use of machine learning for detecting misfires during operation of an internal combustion engine based on crank angle acceleration and U.S. application Ser. No. 17/026,706 (TULA P068X1), which covers the use of machine learning for detecting misfires during operation of an internal combustion engine based on measured exhaust manifold pressure. Both of the above-mentioned applications are incorporated herein by reference for all purposes.

The present invention relates to using machine learning to detect cylinder intake and/or exhaust valve faults during the operation of an internal combustion engine. In a non-exclusive embodiment, a neural network model is initially defined having values of different operational parameters that are indicative of successful and/or faulty valve events. The neural network model is initially used to "learn" when valve faults occur and do not occur on an engine of a test vehicle base on multiple input data sets, each including one or more sensed operational parameters of the test vehicle. During model training (i.e. learning), in response to the input data sets, the valve status for valve events are predicted and are compared to the measured valve status for the valve events, which is provided to the model as ground truth. In development phase, the valve status can be measured by such instrument as valve proximity sensors, in-cylinder pressure transducers or valve spring strain gauges, etc. By processing multiple iterations of input data sets, the neural network "learns" with a higher level of accuracy, and adjusts weights assigned to each of the operational parameters of the model accordingly. The weight assigned to each of the operational parameters defines the relative strength of the interaction of each input provided to the neural network model. Eventually, after a multitude of iterations (e.g., tens of thousands, hundreds of thousands, or millions), a highly accurate model capable of estimating if valves opened or closed during valve events is developed. Once the model is complete, it can be embedded into and used in a production vehicle that is the same or similar as the test vehicle. During operation of the production vehicle with the model embedded therein, various operational parameters are fed to the model. Based on the operational parameters, the model is able to generate an estimate score for each valve event. The estimated score is than converted into a probability that the valve in question either (a) opened or (b) closed during the valve event. The probability is then compared to the actual command provided to the valve during the valve event. If the comparison yields a different result, meaning the valve was commanded to activate but remained closed, or vice versa, then a fault flag is generated. But if the comparison yields a result, then a success flag can optionally be generated.

Valve Lift

Prior to addressing the details of how the model is developed and used for flagging valve faults, a brief tutorial on the lift characteristics of a valve of a cylinder is first provided. In this explanation, valve-lift characteristics for both intake and exhaust valves is described for both successful and faulty activations and deactivations.

Referring to FIG. 1A, a diagram 10 showing the valve lift for exhaust and intake valves of a representative cylinder of an engine commanded to activate is illustrated. When the exhaust and intake valves operate as commanded, each valve opens as signified by the valve lift profiles 12 and 14 respectively. On the other hand if either valve faults and only opens partially or not at all, then the lift profile is signified by the lift profiles 16 and 18 respectively.

Figure 1B:
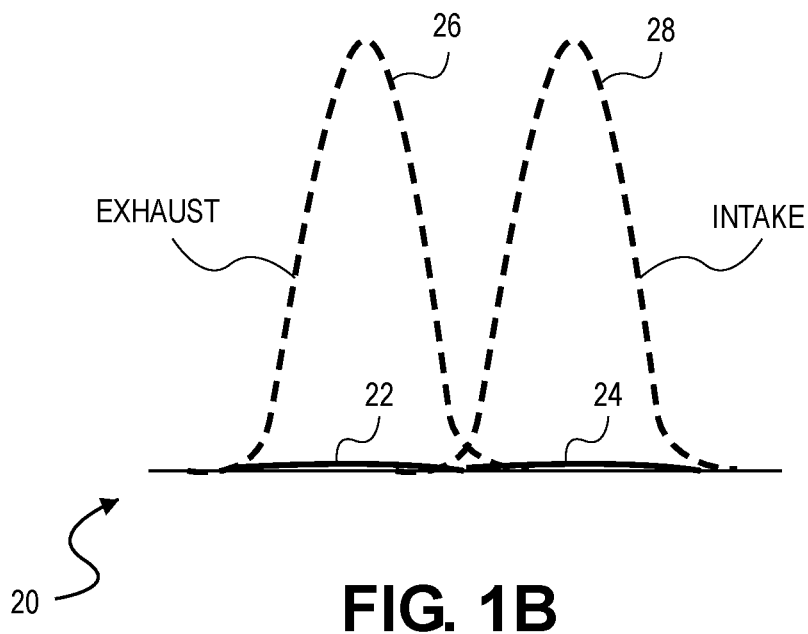
FIG. 1B illustrates a successful and a faulty valve lift for both an intake valve and an exhaust valve of a cylinder when commanded to deactivate or remain closed.

Referring to FIG. 1B, a diagram 20 showing the valve lift for exhaust and intake valves of the representative cylinder commanded to deactivate is illustrated. When the exhaust and intake valves operate as commanded, each valve remains closed as signified by the valve lift profiles 22 and 24 respectively. On the other hand if either valve faults and opens, either partially or fully, then the lift profile is signified by the lift profiles 26 and 28 for the exhaust valve and the intake valve respectively.

It is noted that the intake and exhaust valves of a given cylinder of an internal combustion engine are typically independently commanded to separately either open and/or close. In some situations, both the intake and exhaust valves for a given cylinder are commanded the same, meaning both are commanded to be activated/opened or both are commanded to be deactivated/closed during a given working cycle. However, this is by no means the case in all situations.

In yet other circumstances, the intake and exhaust valves of a cylinder can be independently commanded for the purpose of implementing various re-breathing strategies. For example if a cylinder is operated as an Air Spring (AS) type pneumatic spring over successive working cycles, the pressure within the cylinder may drop too low. To address this situation, a re-breathing strategy may be employed. With re-breathing, the exhaust valve of the cylinder may be commanded to be activated in one working cycle and then the intake valve is activated in the immediately next working cycle, allowing an air charge to be inducted into the chamber, increasing the in-cylinder pressure. Thereafter, the exhaust valve is commanded to be deactivated, maintaining the refreshed pressure within the chamber. Alternatively with Low Pressure Exhaust Springs (LPES) and High Pressure Exhaust Springs (HPES), the intake and exhaust valves of a cylinder can be independently commanded to either open or close so as to maintain either low pressure or high pressure within the cylinder respectively.

Other situations where the intake and/or exhaust valves of a cylinder may be separately and independently commanded. One scenario is when a refire is commanded following two or more skip cycles, one option is to open both the exhaust and the intake, or just the intake of the last skip immediately before the above mentioned re-fire cycle.

Creating the Model

In a non-exclusive embodiment, the model for a given test vehicle is defined by creating and using a neural network to "machine learn" the behavioral characteristics of multiple operational parameters of a test vehicle that are indicative of both successful and faulty valve events. Specifically, the machine learning generally involves:

(1) Providing sample data sets indicative of the operational parameters of the test vehicle to the neural network;

(2) Using the neural network to generate an estimated score each for each valve event of the cylinders of the engines if the corresponding valve either opened or closed.

(3) For each valve event, a Sigmoid function is applied to convert the estimated score into a probability that the valve in question either opened or closed;

(4) Updating the weighted values of the various operational parameters used by the neural network when generating the estimated scores for subsequent valve event. For example, if an intake valve was commanded to be activated, but the intake manifold pressure did not see a significant drop in pressure indicative of an induction event, then an assumption can be made that the intake valve in question did not properly open. Alternatively, if an exhaust valve is commanded to deactivate, but the exhaust manifold sees a significant increase in pressure indicative of an exhaust event, an assumption can be made that the valve event was faulty and opened. In either case, the intake manifold pressure and/or the exhaust manifold pressure can be more heavily weighted than other parameters, such as the amount of Exhaust Gas Recirculation (EG), which is a less relevant indicator with respect to valve behavior.

(5) Repeating (1) though (4) numerous times. Over multiple iterations, the neural network refines the weighting assigned to the various parameters. As a result, the neural network "learns" and becomes ever more accurate in generating the estimated scores for valve events in ever more complex situations. In real world embodiments, at least tens of thousands, if not hundreds of thousands or even millions of iterations of (1) through (4) are performed. In general, the more iterations that are performed, the higher the level of precision the scores are for estimating the behavior of the valves during valve events.

(6) Generating a model with the operational parameters weighted and refined based on the machine learning performed by the neural network.

It is noted that the use of a neural network as described herein for defining the model is just one of several different ways the model can be defined using machine learning. In alternative embodiments, other machine learning approaches can be used, as logistic regression or the use of decision trees.

It is noted that once a model is defined for a given test vehicle, the model is typically best used in a production vehicle that is the same or similar type or class. For example, if an automotive company developed a model for an eight cylinder Diesel engine for use in a semi-tractor trailer truck, then the model can realistically be used in the same or similar production semi-tractor trailer trucks. However, as a general rule, it would be less than ideal to use the same model in a different kind of production vehicle, such as a passenger sedan. Instead, a new model created for the passenger sedan should preferably be used.

Figure 2:
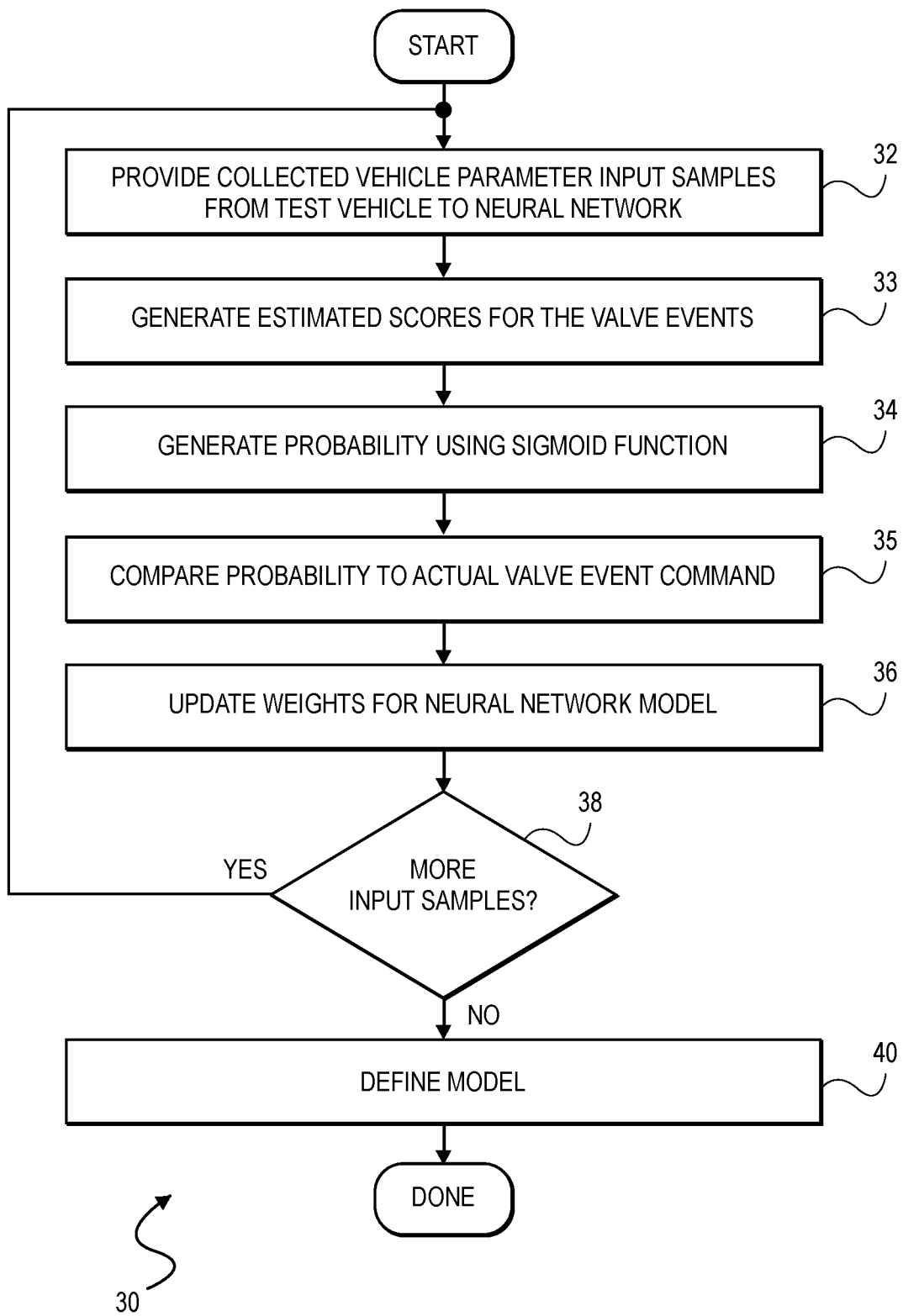
FIG. 2 is a flow diagram intended to show the steps for creating a model to detect valve faults in a test vehicle using machine learning in accordance with a non-exclusive embodiment of the invention.

Referring to FIG. 2, a flow diagram 30 illustrating the steps for defining a model for a test vehicle is illustrated.

In step 32, sample sets of operational parameters of the test vehicle are collected and provided to a neural network. In various embodiments, the operational parameters may include (but are not limited to) one or of the parameters listed in Table I below.

TABLE I

| Operational Parameter | Description |
| --- | --- |
| Exhaust Pressure at every 30 deg during exhaust stroke (0, 30, 60, . . . , 180, 210) | a 1D vector of exhaust pressure with resolution 1 crank angle degree |
| Intake Pressure at every 30 deg during intake stroke (0, 30, 60, . . . , 180, 210) | A 1D vector of intake pressure with resolution 1 crank angle degree |
| Engine speed | A scalar of engine speed |
| Engine Brake Torque | A scalar of engine brake torque |
| Indicated Torque Estimate | A scalar of ECM estimated engine indicated torque |
| VGT Position | A scalar of Variable Geometry Turbocharge Position in unit of percentage (%). |
| EGR Position | A scalar of EGR valve position in unit of percentage |
| Charge Flow | A scalar of charge flow rate in unit of kg/min |
| Previous Cylinder Status | Status of the previous cylinder |
| Next Cylinder Status | Status of the next cylinder |

Again, it is noted that the above-listed operational parameters is not an exhausted list. Either fewer or more operational parameters may be used, including others that are not listed herein, such as crankshaft acceleration or angle, exhaust temperature, exhaust oxygen concentration, etc. Accordingly, the term operational parameters as used herein should be broadly construed to include any operating characteristic, feature or parameter that can be measured or otherwise sensed on a vehicle.

It is further noted that during the development of a model, certain sensors and other measuring equipment may be installed on a given test vehicle that ordinarily would not be used or found on a production vehicle. For example, a test vehicle may be equipped with valve proximity sensors, cylinder pressure transducers, valve spring gauges, solenoid drive transducers, etc., all of which are capable of measuring valve lift of the intake and/or exhaust valves of cylinders of the test engine. By using such measuring equipment, the estimate scores indicative of valve behavior generated by the neural network can be readily compared to the valve behavior as measured by such measuring equipment. As a result, the accuracy of the model can be improved. It is noted, however, that such measurement equipment is typically expensive and not always reliable. The use of such measuring equipment is therefore typically not used on production vehicles, although there generally is no limitation on using such equipment on production vehicles.

In step 33, an estimated score for a given valve event is generated by forward propagating corresponding sample sets of operational parameters of the test vehicle through the neural network. The corresponding sample sets of operational parameters are typically contemporaneous with when the given valve event occurred.

In step 34, a probability that indicative that the valve in question during the given valve event either opened or closed is generated using a Sigmoid function.

In step 35, the probability result is compared to the actual command given to the valve in question for the valve event. If the command was to activate and the probability indicates that the valve opened, the neural network learns that its estimated score was accurate. On the other hand if the probability result differs from the actual command, then neural network learns that its estimated score was in error.

In step 36, the various weights of the different vehicle parameters are revised or updated according to the results of the previous step 35. As a general rule with estimates that are accurate, the individual parameters that were indicative of the correct result are more heavily weighted. On the other hand with estimated scores that are in error, those parameters that were more heavily relied on in generating the inaccurate result may have their weighted values reduced.

In decision step 38, it is determined if more input samples are needed to make to better refine and make the final model more accurate. If more improvement is needed or desired, then steps 32 through 38 are reiterated.

In step 40, on the other hand, the model is defined if no more refinement is needed or desired. The model is typically defined from the refined, weighted values, of the operational parameters of the test vehicle as learned by the neural network over a multitude of iterations as described herein. Once defined, the model can then be embedded or otherwise used in production vehicles, similar to the test vehicle, as described in more detail below.

The Neural Network

Figure 3A:
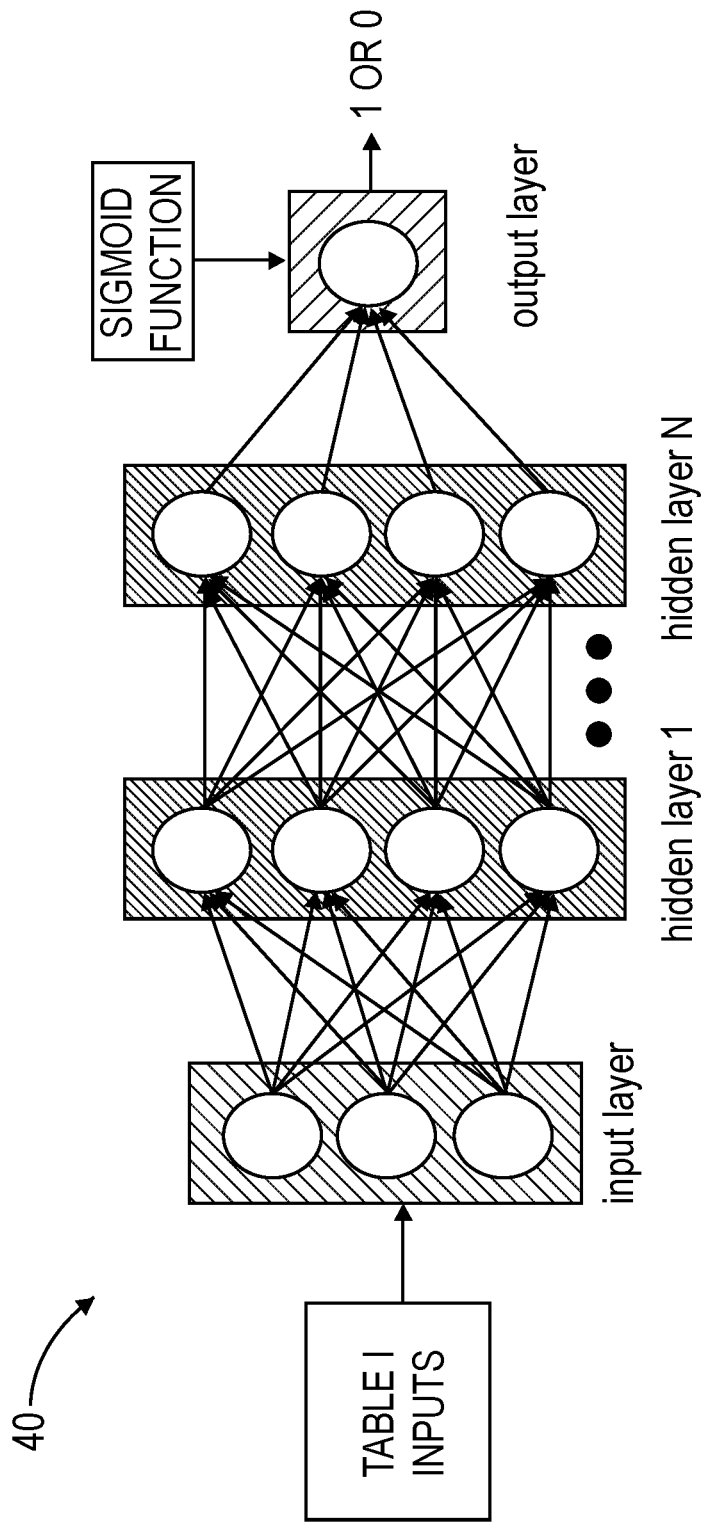
FIG. 3A illustrates a neural network and a loss function equation used for creating the model using machine learning in accordance with a non-exclusive embodiment of the invention.

Referring to FIG. 3A, a neural network 40 used for defining a model for a test vehicle (not illustrated) is shown.

The neural network 40 includes an input layer, one or more hidden layer(s) 1 through N and an output layer. The input layer is arranged to receive a number of inputs, such as those listed above in Table I. It should be understood that the list of inputs provided herein are exemplary and should not be construed as limiting. Fewer or more inputs can be used as well. In yet another optional embodiment, the input layer may optionally normalize the inputs. By normalization, any inputs that are measured on different scales are adjusted to be measured on a common or similar scale.

Each of one or more hidden layers 1-N includes one or more processors ($\theta_1$, $\theta_2$, $\theta_3$, ... $\theta_N$) for implementing functions. Each of the N hidden layers is arranged to receive inputs from previous layer and provide processed outputs to the next layer. For instance, a first hidden layer (1) receives the normalized inputs from the input layer and provides processed outputs to the second hidden layer (2). The second hidden layer (2), after processing its inputs, provides its processed output to the next hidden layer (3). This process is repeated from each of the hidden layers 1 through N. In various embodiments, the number of hidden layers N may widely vary and may include up to 200 hidden layer or even more. In other embodiments, few than 200 hidden layers may be used.

The last hidden layer N processes its inputs and provides its output to the output layer, which may perform further post-processing. In this case, the output layer generates an estimated score for each valve event. The output layer then applies a Sigmoid function to the estimated score for each valve event. The output for each valve event is therefore a probability that the corresponding valve either opened ("1") or remained closed ("0") during the valve event.

The neural network 40 is trained by collecting a large number of samples of the input data under a variety of test engine and vehicle operating condition, such as, but not limited to, firing density, wide range of cylinder loads, a wide range of torque demands, various turbocharger settings, exhaust gas recirculation settings, and a wide range of engine speeds, previous or next cylinder firing status, etc. In an optional embodiment, valve faults may be purposely introduced by deliberately operating the intake and/or exhaust valve in a faulty manner on selected firing opportunities to replicate unsuccessful fires and skips. In response, the neutral network 40 tracks exhaust pressure readings, for both incidental and deliberately induced valve faults, cylinder firings and skips, the status of the above-listed operational parameters of the vehicle, etc. Based on the gathered status data, the neural network 40 learns which exhaust pressure readings correspond to faulty valve operation for both unsuccessful fires and skips and which operational parameters values, under a wide range of operating conditions and setting, are indicative of successful valve activations and deactivations.

As the neural network 40 learns which operational parameters are more reliable indicators of valve behavior, under different circumstances, the weighting of the different operational parameters of the vehicle are adjusted. In this way, the parameters that are more relevant are given more weight, while less the parameters that are less relevant are given less weight. As the weighting of the individual parameters is adjusted, they are propagated across the neural network 40. As a result, the neural network becomes more and more precise or accurate in generating the estimate score for valve events. Eventually after a larger number of iterations, a model is developed that is capable of predicting, to a high level of accuracy, the behavior of valves during valve events based on a given set of contemporaneous operating parameters of the test vehicle.

During the training, the estimated score for valve events are compared to the ground truth (i.e. the measured valve status for the valve events). Each comparison yields one of four outcomes, including:

True Positive, meaning the actual status was for the valve was activated and the probability indicates the valve opened;

True Negative, meaning the actual status was for the valve was deactivated and the probability indicates that the valve remained closed;

False Positive, meaning the actual status was for the valve activated, but the probability indicates that the valve remained closed; and False Negative, meaning the actual status was for the valve was deactivated, but the probability indicates that the valve opened.

Referring to FIG. 3B, a diagram illustrating the four possible outcomes is illustrated. As noted, the four outcomes include false positive, false negative, true positive and true negative. With both of the false conditions, the prediction of the behavior of a valve during a valve event differs from how the valve actually behaved. With the two positive conditions, the prediction of the behavior of the valve matches the actual status or behavior of the valve. With the two false conditions, the actual valve behavior or status differed from the prediction.

FIG. 3 also shows a loss function equation:

$$\frac{1}{m}\left[\sum_{i=1}^{m}-y^{(i)}\log(h_\theta(x^{(i)}))+(1-y^{(i)})\log(1-h_\theta(x^{(i)}))\right]$$

With the variables:
m defined as the number of samples;
y defined as the true valve status;
x, which defines an input data of one or more of the operational parameters listed above in Table I; and
$h_\theta(x)$ is the combination of the weights and neural network architecture parameters defining the hidden layers of the neural network 40.

As previously described, the model parameters defining the neural network 40 and the weights for each input to each layer of the neural network 40 are adjusted. After multiple iterations, a model with an ideal combination of a set of model architecture parameters and a set of weights for all relevant operational parameters is developed with high level of accuracy. The adjustment of the weight assigned to each of the operational parameters represents an adjustment of the relative strength of the interaction of each input provided to the neural network model. The loss function described above gives an indication on how well the model is trained. The lower the loss function score, the better is the accuracy of the model. The ideal and/or highly accurate set of weights and the most relevant operational parameters will typically correspond to a lower loss function score. A loss function can be of a convex or a non-convex type and an optimization strategy like the gradient descent algorithm is deployed to find the best weights and the most relevant operational parameters that minimizes this loss function. The training process can also be stopped when the loss function score is no longer improved or improvement is minimal.

Use of the Model in Production Vehicles

As previously described, once a model for a given type of vehicle is defined, it can then be embedded into the engine controller or the equivalent of a production vehicle. The model can then be used to generate valve fault flags for the valves of cylinders that do not operate or behave as commanded. In other words if a valve (either an intake or exhaust valve) is commanded to be active, but fails to open for any reason, then a fault flag can be generated. Alternatively, if a valve is commanded to be deactivated, but opens for any reason, then again a fault flag can be generated. In an optional embodiment, success flags can also be generated for valve commands that are successfully implemented by the valves.

Figure 4:
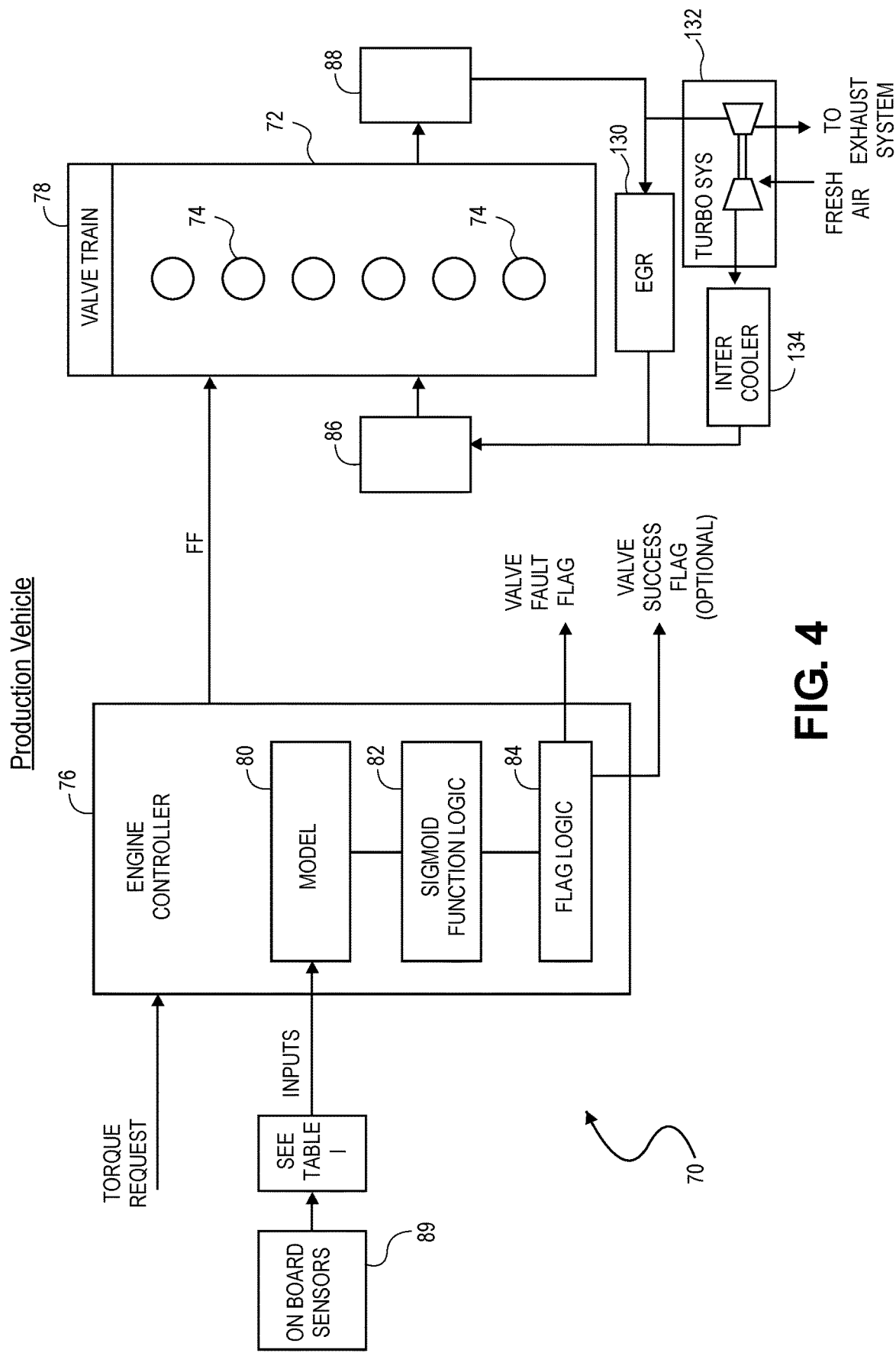
FIG. 4 shows an engine system of a production vehicle with the model embedded therein for detecting valve faults in accordance with a non-exclusive embodiment of the invention.

Referring to FIG. 4 an engine system 70 of a production vehicle (not illustrated) with a suitable model embedded therein for detecting valve faults is illustrated. The engine system 70 includes an internal combustion engine 72 with a plurality of cylinders 74, an engine controller 76 and a valve train 78. As is well known in the art, each of the cylinders 74 includes one or more intake valve(s) and one or more exhaust valve(s) (both not illustrated). In addition, the engine system includes an air intake manifold 86 and an exhaust manifold 88. In addition, a number of onboard sensors 89 are provided on the host vehicle for collecting data indicative of the operational parameters of the production vehicle while operating. Such onboard sensors include but are not limited to intake manifold pressure sensor, exhaust manifold pressure sensor, a mass flow sensor, EGR valve position sensor, turbo vane position sensor, etc.

During operation, the engine controller 76 is responsible for receiving a torque request, and in response, providing a firing fraction to the internal combustion engine 72. As a general rule, the firing fraction is selected as necessary to meet the requested torque demand, while maximizing fuel economy. For example, when full displacement of the engine 72 is needed to meet the torque request, then the commanded firing fraction provided to the engine 72 is one (FF=1). In response, the engine 74 operates at its full displacement, and all the cylinders 74 are fired. In other circumstances the torque request may be relatively low, for example, when the vehicle is cruising at a reasonable speed on a flat highway. Under such circumstances, the engine controller 76 determines a suitable firing fraction (e.g., FF=¼ or FF=⅓) that meets the requested torque demand With firing fractions less than one, the engine 72 operates at a reduced effective displacement that is less than its full displacement by skipping at least some of the firing opportunities of one or more of the cylinders 74. When a cylinder is skipped during a given working cycle, its intake and exhaust valves are typically deactivated and no fuel is provided. As a result, there is no combustion and pumping losses are reduced, thereby improving fuel economy. On the other hand when a cylinder is fired, its intake valve(s) are opened during the induction stroke to allow an air charge to be inducted into the chamber. In the exhaust stroke, the exhaust valve(s) are typically opened, allowing gases that were combusted during combustion to be exhausted out of the chamber.

In certain non-exclusive embodiments, the engine controller 76 may also be responsible for selectively operating the cylinders 74 as one of several different types of pneumatic springs, including AS, LPES and/or HPES type pneumatic springs. As discussed above, the selective operation of one of these types of pneumatic springs may also require various re-breathing strategies, meaning intake and/or exhaust valves may be separately and independently activated or deactivated as needed. For more details on these types of pneumatic springs, see U.S. Pat. No. 10,619,584 and U.S. Provisional Application 63/052,069 filed Jul. 15, 2020, both incorporated herein by reference for all purposes.

The valvetrain 78 is responsible for opening or closing the intake and exhaust valves of the cylinders 74 for both (a) implementing the firing or skipping of cylinders and (b) implementing re-breathing strategies. In response to activate or deactivate commands from the engine controller 76, the valvetrain 78 is responsible for either opening the valves or maintaining the valves as commanded during valve events. In other words, in response to an activate command for a given valve during a valve event, the valvetrain open the valve. Alternatively, the valve is maintained closed in response to a deactivate command. As the operation of a valvetrain is all well known, a detailed working explanation is not provided herein for the sake of brevity.

A valve may fail to behave as commanded, however, for a variety of reasons. If an activate command arrives too late for example, the valve may not open at all or may only partially open. Similarly, valve faults may also occur with deactivation commands. If a deactivate command arrives too late, the valve may inadvertently either partially or fully open. In either situation, a valve fault has occurred because the behavior of the valve was different than commanded.

In accordance with the present invention, the controller 76 is configured to generate a valve fault flag when a valve fault occurs. To generate valve fault flags, the controller 76 includes a model 80, sigmoid function logic 82, and flag logic 84.

The model 80 is fed sample sets of operational parameters (e.g., the same or a similar as provided in Table I above) as collected on the production vehicle during operation. In response, the received operational parameters are compared with the weighted operational parameters as defined by the model 80. As previously described, the weighting for the operational parameters in the model were previously defined during the development phase using machine learning implemented by the neural network.

In response, the model generates estimated scores for the valve events (e.g., intake valves, exhaust valves or both) of the cylinders 74 during operation of the vehicle. The sigmoid function logic 82 generates a probability output for each estimated score. In other words, a probability is assigned to each valve event that the corresponding valve either opened or closed. The flag logic 84 then compares the probability outcome for each valve event with the actual command given to the valve in question.

Figure 5:
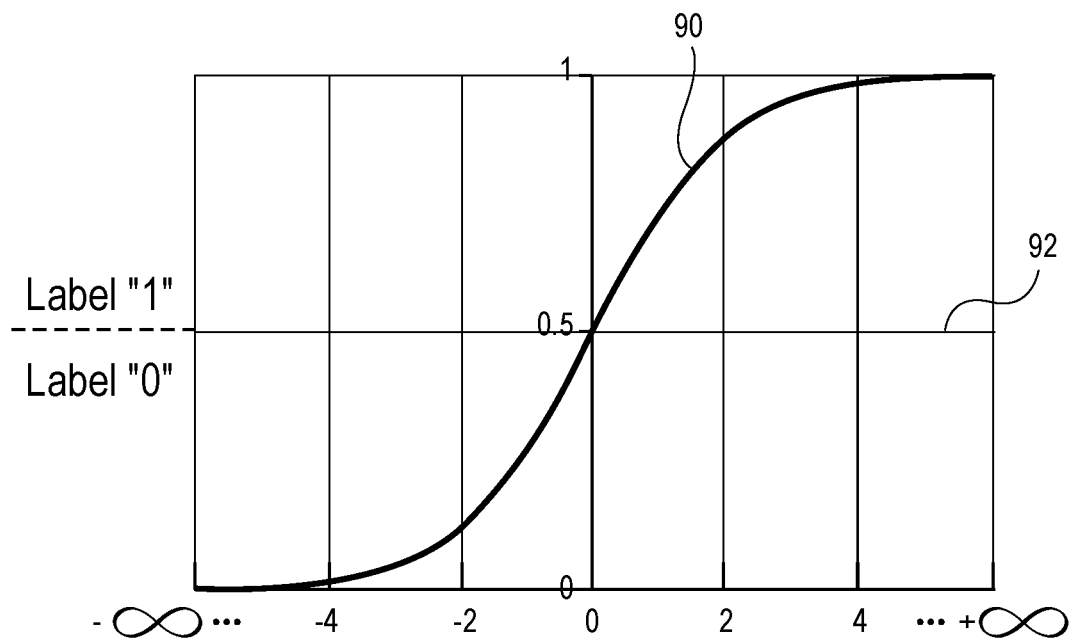
FIG. 5 is a diagram illustrating how a sigmoid function is used to classify a probably output from the model into either of the two ranges in accordance with a non-exclusive embodiment of the invention.

Referring to FIG. 5, a diagram illustrating how the sigmoid function logic 82 is used to generate a probability for a given estimated score is illustrated. As depicted by the curve 90, an estimated score, as generated by the model 80 for a given valve event, may fall anywhere along the curve 90, which range anywhere from negative infinity to positive infinity. The sigmoid function logic 82 essentially takes the takes estimated score for each valve event and classifies it into either the first range or a second range that are separated by a threshold 92.

In the non-exclusive embodiment shown, the threshold is 0.5. Accordingly any estimated score above 0.5 falls within the first value range, which signifies a probability (1) that the valve opened during the valve event. Alternatively, any estimated score below the 0.5 threshold signifies probability ("0") that the valve remained closed during the valve event. It should be noted that the value of the threshold of 0.5 and the labels "1" and "0" as used herein are merely exemplary. In other embodiments, other threshold values may be used and other labels for signifying probabilities that a valve opened or closed may be used.

Figure 6:
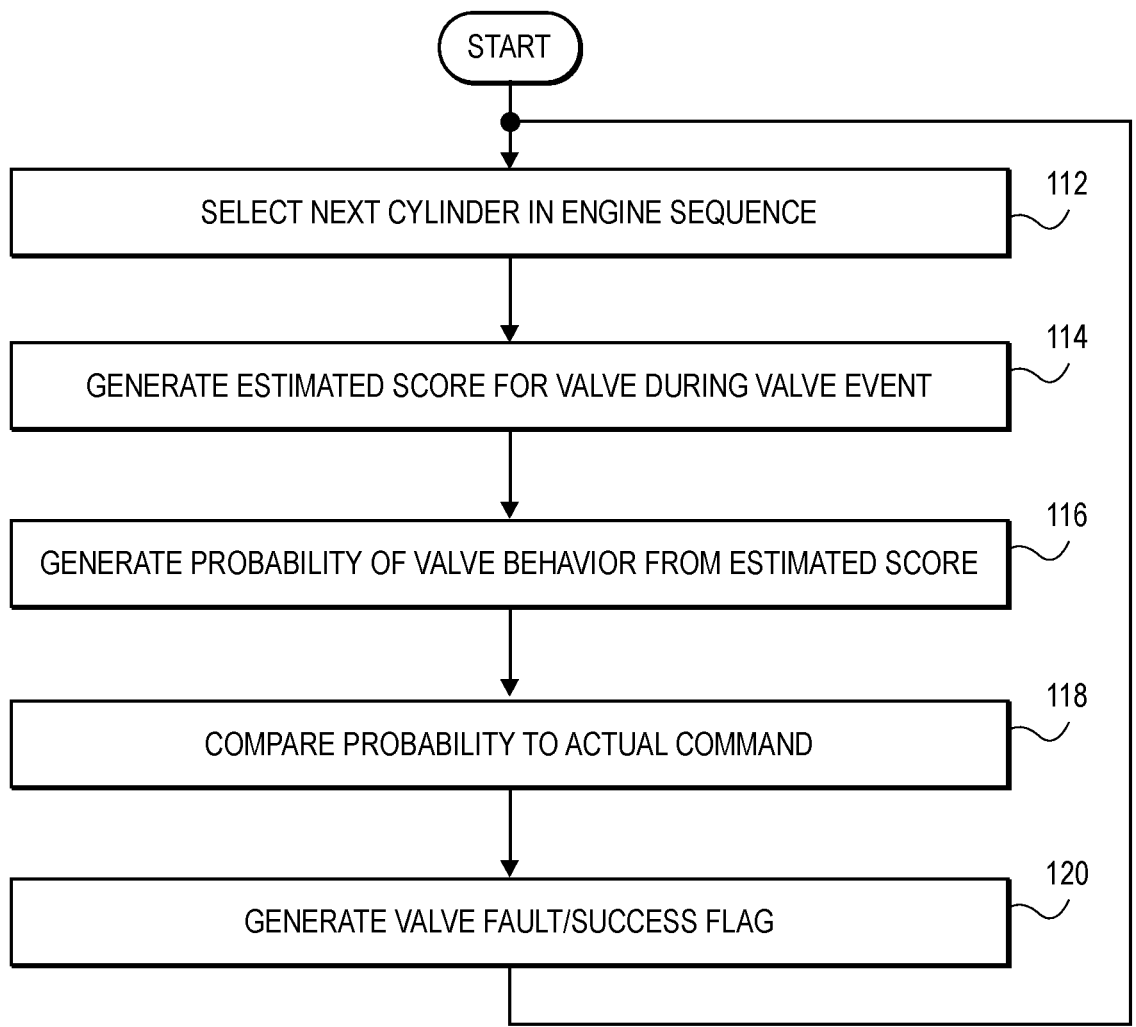
FIG. 6 is a flow diagram performed by the engine controller in the production vehicle to generate valve fault flags using the embedded model in accordance with a non-exclusive embodiment of the invention.

Referring to FIG. 6, a flow diagram 110 performed by the engine controller 76 is illustrated. By implementing this sequence, valve fault flags (and optionally valve success flags) can be generated on a continuous basis for all the valve events performed by the input and/or exhaust valves of each cylinder 74 of the internal combustion engine 72.

It is noted that for the sake of simplicity, the flow diagram 110 described below addresses only a single valve, which could be either an intake or exhaust valve, associated with a select cylinder 74. It should be understood that in actual embodiments, the sequence of flow diagram 110 would be performed for each valve (i.e., one or more intake valves and one or more exhaust valves) for each cylinder 74. In this way, a valve fault flag (and optionally a success flag) can be generated for all the valve events associated with all the cylinders 74 of the engine 72 during operation.

In the initial step 112, the cylinder 74 next in the engine cycle sequence is selected.

In step 114, the model 80 generates an estimated score for a select valve event associated with the select cylinder 74. Again, depending on the how the contemporaneous vehicle operational parameters compares to the weighted operational parameters of the model 80, the estimated score may range anywhere on the curve 90 of FIG. 5A from negative infinity to positive infinity.

In step 116, the sigmoid function logic 82 compares the estimated score to the threshold 92 and generates a probability output that the valve associated with the select cylinder either opened or remained closed during the valve event.

In step 118, the probability is compared by the flag logic 84 with the actual command for the valve during the valve event.

In step 120, the flag logic 84 generates a valve fault flag in situations when the estimate does not match the actual command, a success flag can also be optionally generated when the estimate and the actual command match.

In optional embodiments, the above steps 112 through 120 are (a) performed in parallel for each valve of the select cylinder 74 and (b) repeated over and over for the cylinders 74 as they sequence through each engine cycle. As a result, the model 80 can be used to generate fault (or success flags) for each valve event.

Figure 7:
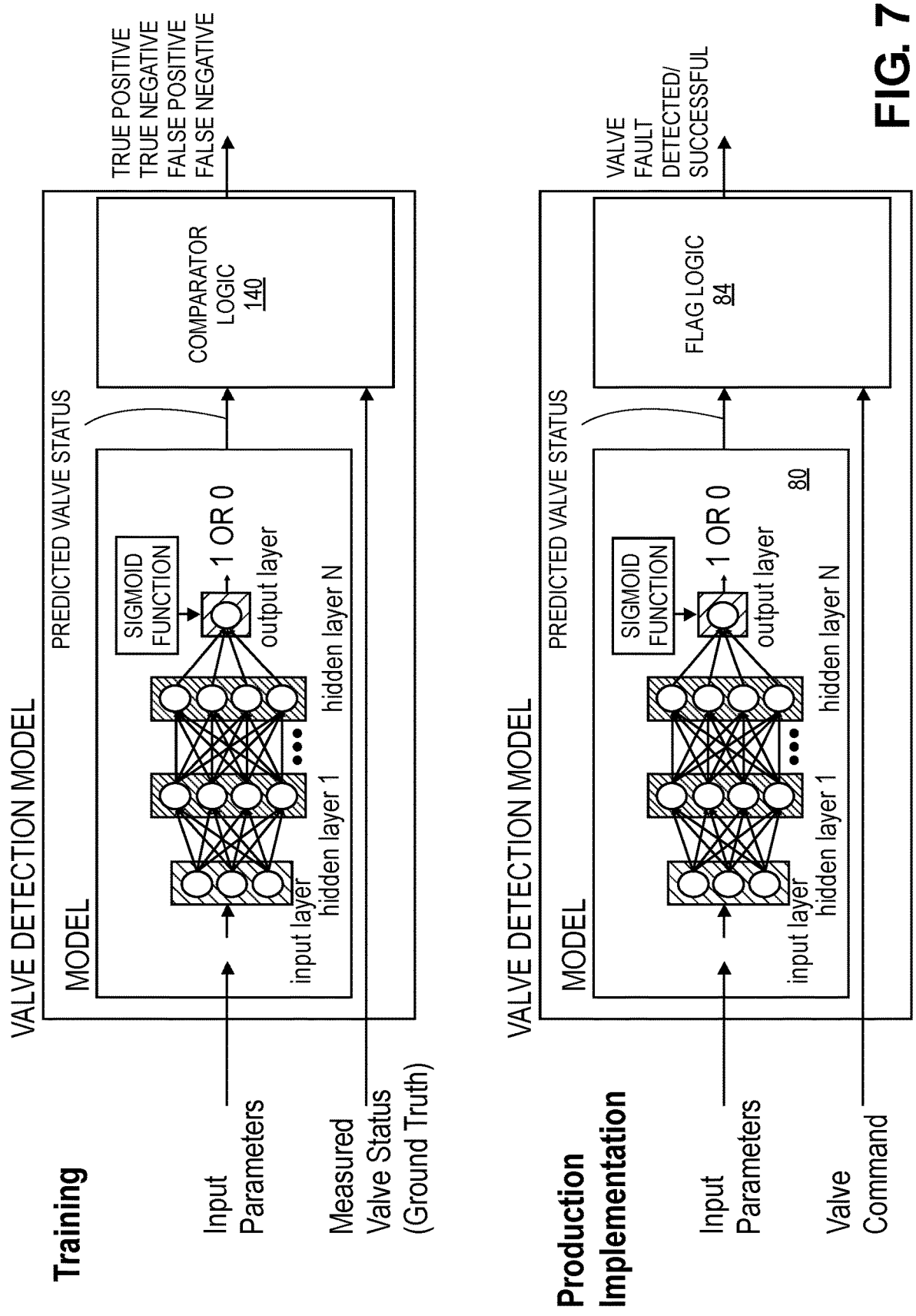
FIG. 7 is a logic diagram comparing how the model is used during training and in a production vehicle in accordance with a non-exclusive embodiment of the invention.

Referring to FIG. 7, a logic diagram comparing how the model is used during training versus in a production vehicle in accordance with a non-exclusive embodiment of the invention.

In the upper portion of the figure, the module in training receives the input data sets of the operational parameters of the test vehicle. In response, the model generates a predictive valve status for each valve event of each cylinder of the test engine, which is provided to comparator logic 140. The measured valve status (e.g., ground truth) for the valve events is also provided to the comparator logic 140. In response, the comparator logic 140 generates a flag for one of four possible outputs (True Positive, True Negative, False Positive, and False Negative). Depending on the outcomes for numerous valve events, the weighted parameters of the model are updated as previously described.

In the lower portion of the figure, the model when embedded in a production vehicle receives the input data indicative of the real time operational parameters of the vehicle during operation. In response, the model generates a predicted valve status (either a "1" or "0") for each valve event. The flag logic 84 receives for each valve event the predicted valve status and the actual valve command. In response, the flag logic 84 generates for each valve event a valve fault flag if the two are different, or optionally a success flag if the two are the same.

Alternative Engine Embodiments

It should be understood that the engine 72 as illustrated is merely exemplary and may include either fewer or more cylinders 74, such as, but not limited to 2, 3, 4, 5, 8, 10, 12, or 16 cylinders. In addition, the cylinders may have one or more intake valves and/or one or more exhaust valve(s).

The engine 72 can be a compression ignition engine, a spark-ignition (SI) engine, an engine that combines spark ignition with compression ignition, or an engine that ignites the air fuel mixture with a different technology.

The engine 72 can be any type of engine that is capable of selectively operating at full displacement or one or more reduced displacements. In one variable displacement embodiment, the engine 72 can be controlled in a conventional variable displacement manner where a group or bank of one or more cylinders 74 may be selectively deactivated to reduce the effective displacement of the engine 72 to less than full displacement. Alternatively, the engine 72 may be skip fire controlled.

Skip Fire Engine Control

Skip fire engine control is a known approach for varying the effective displacement of internal combustion engines. During skip fire operation, some firing opportunities of cylinders are fired, while other firing opportunities of cylinders are skipped. By operating the engine at different firing densities or fractions (e.g., ⅛, 2/7, ⅓, ¼, ½, etc.), the engine is allowed to operate at different effective reduced displacements, all of which are less than the full displacement (i.e., a firing fraction of 1) of the engine. In a variation of skip fire, often called dynamic skip fire, the decision to fire or skip a cylinder is dynamically made either (a) on a firing opportunity-by-firing opportunity basis or (b) on an engine cycle-by-engine cycle basis.

Skip fire engine control contemplates selectively skipping the firing of certain cylinders 74 during selected firing opportunities. Thus, for a given effective engine displacement that is less than the full displacement, a particular cylinder 74 may be successively fired during one firing opportunity, skipped during the next firing opportunity and then selectively skipped or fired during the next firing opportunity. From an overall engine perspective, skip fire control sometimes results in successive engine cycles having a different pattern of skipped and fired cylinders. This is contrasted with conventional variable displacement engine operation in which a fixed set of the cylinders are deactivated during certain low-load operating conditions. The firing sequence may also be expressed as a firing fraction or firing density, either of which indicates a ratio of fired firing opportunities to total firing opportunities.

With skip fire, much finer or refined engine control is possible than with conventional variable displacement engines. By way of comparison, fractions such as ⅓ may be implemented using skip fire engine control, but cannot be implemented with a conventional 4-cylinder variable displacement engine. For instance, a commercially available skip fire controller offered by the assignee of the present application provides for seventeen (17) different firing fractions, each indicative of a different reduced effective engine displacement.

With skip fire engine control, a number of advantages are realized. First, with skipped cylinders, pumping losses are reduced, thereby improving fuel efficiency. Second, the displacement of the engine is effectively reduced; meaning the volume of exhaust gases passing through the aftertreatment system of the vehicle is reduced. By reducing the exhaust gas flow, the aftertreatment system of the vehicle can operate at higher temperatures, which in turn improves conversion efficiencies, which tends to decrease the output of noxious emissions.

Skip fire engine control is described in U.S. Pat. Nos. 7,954,474; 7,886,715; 7,849,835; 7,577,511; 8,099,224; 8,131,445; 8,131,447; 8,616,181; 8,701,628; 9,086,020; 9,120,478: 9,200,587; 9,650,971; 9,328,672; 9,239,037; 9,267,454; 9,273,643; 9,664,130; 9,945,313; and 9,291,106; and U.S. patent application Ser. No. 13/886,107; each of which is incorporated herein by reference in its entirety for all purposes.

Dynamic Skip Fire

With certain implementations of skip fire engine control, a decision to fire or not fire a given cylinder of an engine is made dynamically, meaning on a firing opportunity-by-firing opportunity or an engine cycle by engine cycle basis. In other words, prior to each successive firing opportunity, a decision is made to either fire or skip the firing opportunity. In various embodiments, the firing sequence is determined on a firing opportunity by firing opportunity basis by using a sigma delta, or equivalently a delta sigma, converter. Such a skip fire control system may be defined as dynamic skip fire control or "DSF". For more details on DSF, see U.S. Pat. Nos. 7,849,835, 9,086,020 and 9,200,575, 10,247,121, each incorporated by reference herein for all purposes.

EGR, Turbo and Intercooler Systems

Referring again to FIG. 4, the engine system 70 of the production vehicle may optionally include one or more of an Exhaust Gas Recirculation (EGR) system 130, a turbo system 132 and an intercooler system 134. A brief explanation of each of these systems is provided below.

The EGR system 130 includes an EGR valve that adjustably controls the flow rate of exhaust gas from an exhaust manifold 88 to the input manifold 86. The EGR system also optionally include an exhaust gas cooler that cools the hot exhaust gases before providing to the input manifold 86. An optional exhaust gas cooler bypass valve further allows some or all of the recirculated exhaust gas to be diverted around the exhaust gas cooler. During operation, the engine controller 76 generates a control signal to adjust the EGR to various positions between fully opened or fully closed. As a result, the volume of exhaust gas that is recirculated back to the cylinders 74 can be controlled for the purpose of mitigating or reducing hydrocarbon and/or $NO_x$ emissions.

The turbo system 132 typically includes a turbine and a compressor. During operation, the turbine is rotated by the hot exhaust flow from the exhaust manifold 88 that is not recirculated by the EGR system 130. In turn, the rotating turbine drives the compressor causing the fresh air intake to be compressed, boosting its pressure at the output of the turbo system. In optional embodiments, the turbo system 132 may include a waste gate or variable vane or geometry turbine to control the amount of power extracted from the flowing exhaust gases. The amount or degree of compression is generally dictated via a turbo control signal from the engine controller 76 to the turbo system 132. The exhaust flow from the turbo system 132 continues to an aftertreatment system, which removes noxious pollutants in the exhaust gas. The exhaust gas may then flow through an optional exhaust throttle (not illustrated) and then out a tailpipe into the atmosphere.

In yet other optional embodiments, the output of the compressor of the turbo system 132 may be directed to an intercooler 134. Within the intercooler 134, a charge cooler bypass valve is provided, which adjustably allows compressed air to flow into charge air cooler or to be diverted via a bypass around the charge air cooler. The intercooler 134 lowers the temperature of the compressed air, which in turn, allows more air to be pumped through the engine 72, increasing the maximum torque output. A variable valve controls the amount of cooled and/or non-cooled compressed air provided to the intake manifold 86.

CONCLUSION

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein but may be modified within the scope and equivalents of the appended claims.

What is claimed is:

1. An engine system for a vehicle, comprising:
   an internal combustion engine having a plurality of cylinders; and
   an engine system controller configured to:
   operate the internal combustion engine in a skip fire mode where at least one cylinder is fired, skipped and either fired or skipped over successive working cycles while the internal combustion engine is operating at an effective reduced displacement that is less than full displacement of the internal combustion engine;
   generate a command to either open or close a valve associated with a select cylinder, selected among the plurality of cylinders, for a given working cycle while the internal combustion engine is operating in the skip fire mode, the valve commanded to be either opened or closed during the given working cycle for any of the following purposes:
   (i) the select cylinder is commanded to be fired during the given working cycle while the internal combustion engine is operating in the skip fire mode;
   (ii) the select cylinder is commanded to be skipped during the given working cycle while the internal combustion engine is operating in the skip fire mode; and
   (iii) for controlling air pressure within a combustion chamber of the select cylinder when skipped during the given working cycle;
   feed one or more signals indicative of one or more operational parameters of the vehicle to a model, the model specifying weighted variables for the one or more operational parameters of the vehicle respectively, the weighted variables of the model derived from machine training;
   compare the command to an output of the model, the output of the model being a probability of a behavior of the valve associated with the select cylinder during the given working cycle; and
   generate a valve fault flag if the comparison yields that the probability of the behavior of the valve does not match the command.

2. The engine system of claim 1, wherein the model is further configured to generate the probability by:
   generating an estimated score for the behavior of the valve associated with the select cylinder during the given working cycle by propagating the one or more operational parameters of the vehicle through the model; and
   generating the probability of the behavior of the valve by applying a sigmoid function to the estimated score;
   wherein the probability of the behavior of the valve is indicative of either a first state indicating that the valve opened during the given working cycle or a second state indicative that the valve remained closed during the given working cycle.

3. The engine system of claim 1, wherein the fault flag is generated if the command was to open the valve during the valve event, but the probability indicates that the valve remained closed during the given working cycle.

4. The engine system of claim 1, wherein the fault flag is generated if the command was to close the valve during the given working cycle, but the probability indicates that the valve opened during the given working cycle.

5. The engine system of claim 1, wherein the engine system controller is further configured to generate a success flag if the command was to open the valve during the given working cycle and the probability indicates that the valve opened during the given working cycle.

6. The engine system of claim 1, wherein the engine system controller is further configured to generate a success flag if the command was to close the valve and the probability indicates that the valve remained closed during the given working cycle.

7. The engine system of claim 1, wherein the operational parameters include one of the following:
   (a) exhaust manifold pressure;
   (b) intake manifold pressure;
   (c) speed of the internal combustion engine;
   (d) brake torque of the internal combustion engine;
   (e) an indicated torque estimate;
   (f) a vane position of a Variable Turbo Geometry (VTG) of a turbocharger associated with the internal combustion of the vehicle;
   (g) Exhaust EGR valve position;
   (h) charge flow;
   (i) previous cylinder status;
   (j) next cylinder status; or
   (k) any combination of (a) through (j).

8. The engine system of claim 1, wherein the internal combustion engine is one of the following:
   (a) a Diesel engine;
   (b) a gasoline engine;
   (c) a compression-ignition engine;
   (d) a spark-ignition engine.

9. The engine system of claim 1, wherein the engine system controller is further configured to operate the select cylinder as an Air Spring (AS) when the select cylinder is skipped during the given working cycle.

10. The engine system of claim 1, wherein the engine system controller is further configured to operate the select cylinder as a Low-Pressure Exhaust Spring (LPES) when the select cylinder is skipped during the given working cycle.

11. The engine system of claim 1, wherein the engine system controller is further configured to operate the select cylinder as a High-Pressure Exhaust Spring (HPES) when the select cylinder is skipped during the given working cycle.

12. The engine system of claim 1, wherein the engine system controller controls the air pressure within the combustion chamber of the select cylinder by commanding the valve to either open or close for the purpose of inducting an air-charge into the combustion chamber of the select cylinder when skipped during the given working cycle.

13. The engine system of claim 1, wherein the engine system controller controls the air pressure within the combustion chamber of the select cylinder by commanding the valve to either open or close for the purpose of maintaining pressure within a desired pressure range in the combustion chamber of the select cylinder when skipped during the given working cycle.

14. The engine system of claim 13, wherein the desired pressure range further comprises one of the following:

(a) a desired low-pressure range; or
(b) a desired high-pressure range.

15. The engine system of claim 1, wherein the valve associated with the select cylinder is an intake valve.

16. The engine system of claim 1, wherein the valve associated with the select cylinder is an exhaust valve.

17. The engine system of claim 1, wherein the engine system controller is further configured to generate multiple commands to either open or close a multiplicity of valves associated with the plurality of cylinders respectively, the multiple commands configured to separately and individually control the multiplicity of valves to either open or close for any of the purposes (i), (ii), and (iii) for each of the plurality of cylinders during operation of the internal combustion engine in the skip fire mode respectively.

18. The engine system of claim 1, wherein the engine system controller is further configured to operate the internal combustion engine in a dynamic skip fire mode wherein decisions to either fire or skip each of the plurality of cylinders is dynamically made either (i) on a firing opportunity-by-firing opportunity basis or (ii) on an engine cycle-by-engine cycle basis.

19. The engine system of claim 1, wherein the select cylinder includes an intake valve and an exhaust valve, and the engine system controller is further configured to separately and independently command the intake valve and the exhaust valve to be either opened or closed during the given working cycle, wherein the valve associated with the select cylinder can be either the intake valve or the exhaust valve.

20. The engine system of claim 1, wherein the output of the model is derived from the one or more signals indicative of the one or more operational parameters of the vehicle fed to the model.

* * * * *